(12) United States Patent
Noh (10) Patent No.: US 11,228,042 B2
(45) Date of Patent: Jan. 18, 2022

(54) ALUMINUM SEPARATOR FOR FUEL CELL AND MANUFACTURING METHOD THEREOF

(71) Applicants: Hyundai Motor Company, Seoul (KR); KIA Motors Corporation, Seoul (KR)

(72) Inventor: Yong Gyu Noh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 16/558,959

(22) Filed: Sep. 3, 2019

(65) Prior Publication Data
US 2020/0335802 A1    Oct. 22, 2020

(30) Foreign Application Priority Data
Apr. 18, 2019    (KR) .................. 10-2019-0045274

(51) Int. Cl.
*H01M 8/0228*    (2016.01)
*H01M 8/0213*    (2016.01)
*H01M 8/0206*    (2016.01)

(52) U.S. Cl.
CPC ....... *H01M 8/0228* (2013.01); *H01M 8/0206* (2013.01); *H01M 8/0213* (2013.01)

(58) Field of Classification Search
None
See application file for complete search history.

(56) References Cited

U.S. PATENT DOCUMENTS

2018/0013153 A1    1/2018    Kamepalli et al.

FOREIGN PATENT DOCUMENTS

| JP | 2006049209 A | * | 2/2006 |
|----|----|----|----|
| JP | 2006049209 A | | 2/2006 |
| JP | 2010129464 A | * | 6/2010 |
| JP | 5439965 B2 | | 3/2014 |
| JP | 5493341 B2 | | 5/2014 |
| KR | 101344216 B1 | | 12/2013 |
| KR | 20150067695 A | * | 6/2015 |

OTHER PUBLICATIONS

Conghua "CH" Wang, "Corrosion Resistant Coating of Metal Bipolar Plates for PEM Fuel Cells", ThreadStone Technologies, Inc., Feb. 14, 2017, 14 pp.

* cited by examiner

*Primary Examiner* — Daniel S Gatewood
(74) *Attorney, Agent, or Firm* — Mintz Levin Cohn Ferris Glovsky and Popeo, P.C.; Peter F. Corless (57) ABSTRACT

Disclosed are an aluminum separator for a fuel cell and a manufacturing method thereof, in which a coating layer is formed on a surface of the aluminum separator, thus increasing thermal conductivity and electrical conductivity as well as corrosion resistance. The aluminum separator includes a separator substrate provided in a separator shape using aluminum; and a coating layer formed on a surface of the separator substrate by coating with a composite material composed of graphene and a radical scavenger.

10 Claims, 5 Drawing Sheets

FIG. 1

-PRIOR ART-

ALUMINUM SEPARATOR FOR FUEL CELL AND MANUFACTURING METHOD THEREOF

CROSS REFERENCE TO RELATED APPLICATION

The present application claims priority to and the benefit of Korean Patent Application No. 10-2019-0045274, filed on Apr. 18, 2019, the entire contents of which is incorporated herein by reference.

FIELD

The present disclosure relates to an aluminum separator for a fuel cell and a manufacturing method thereof, in which a coating layer is formed on a surface of the aluminum separator, thus increasing thermal conductivity and electrical conductivity as well as corrosion resistance.

BACKGROUND

The statements in this section merely provide background information related to the present disclosure and may not constitute prior art.

As well known in the art, a fuel cell is a kind of power generator that converts chemical energy of fuel into electric energy through an electrochemical reaction in a stack. Fuel cells have a wide range of applications, including serving as industrial power generators, serving as household power generators, powering vehicles, and powering small electronic devices such as portable devices. In recent years, fuel cells have increasingly been used as high efficiency clean energy sources.

Figure 1:
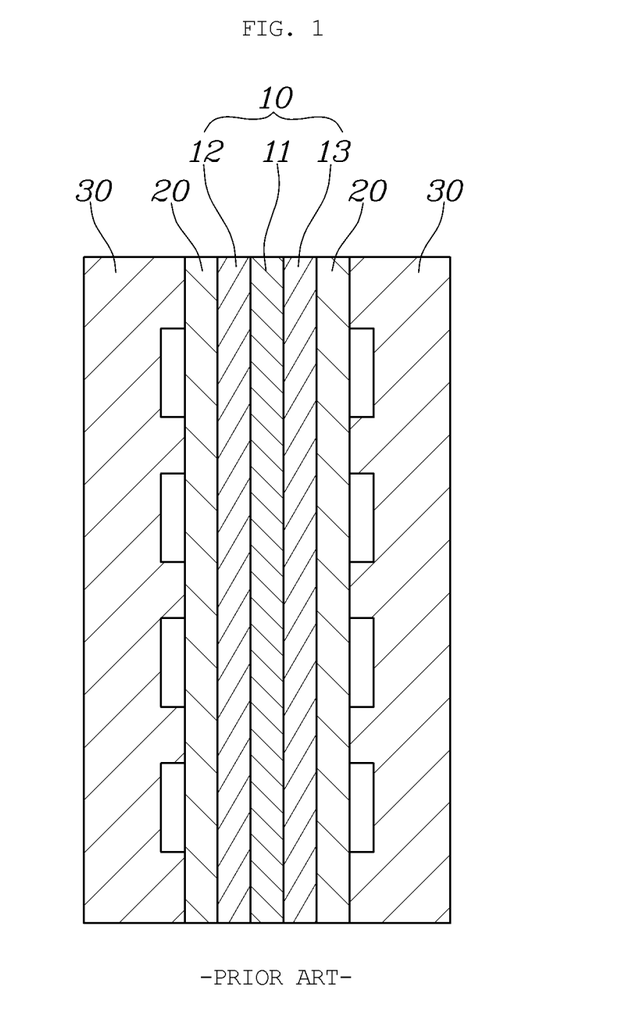
FIG. 1 is a view showing a unit cell of a typical fuel cell.

FIG. 1 is a view showing a unit cell of a typical fuel cell.

As shown in FIG. 1, a typical fuel cell has a membrane electrode assembly 10 (MEA) located at the innermost portion thereof. The MEA includes a polymer electrolyte membrane 11 (PEM) allowing transport of positively charged ions (protons) therethrough, and catalyst layers (CLs), that is, a cathode 12 and an anode 13, applied on opposite surfaces of the PEM to cause hydrogen and oxygen to react.

Furthermore, gas diffusion layers 20 (GDLs) are laminated outside of the MEA 10 where the cathode 12 and the anode 13 are located, and separators 30, each having a flow field for supplying fuel and discharging water generated by reactions in the MEA, are respectively located outside of the GDLs 20.

In particular, such a separator has to perform additional functions such as supporting the cell stack and discharging reaction heat in addition to the main role of supplying reactive gas, discharging generated water, and moving electricity. Due to such various functions of the separator, various electrochemical, mechanical, and physical characteristics are desirable.

For example, a material used for the separator may have high electrical conductivity and thermal conductivity, and high chemical stability such as corrosion resistance. In addition, high airtightness against a refrigerant and gas is desirable, and high mechanical strength assists in supporting the stack.

Therefore, in order to satisfy such characteristics, a separator made of metal such as stainless steel has been manufactured and used.

In the case of manufacturing a separator using stainless steel, there is an advantage of satisfying the electrochemical, mechanical, and physical characteristics described above. However, due to the heavy weight of the steel, there has been a demand for changing a material in terms of weight reduction of the fuel cell stack.

For this reason, in recent years, studies have been made to manufacture a separator using aluminum, which is a typical lightweight material and has excellent thermal conductivity and electrical conductivity, as well as being superior in terms of formability and price. However, aluminum is problematic in that the corrosion resistance may not be sufficient, and the resistance may increase due to an oxide film formed upon exposure to air.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides an aluminum separator for a fuel cell and a manufacturing method thereof, in which graphene having excellent thermal conductivity and electrical conductivity and a radical scavenger are coated on a surface of a separator substrate, thus achieving an increase in corrosion resistance, thermal conductivity, and electrical conductivity of the separator, while achieving weight reduction.

According to one aspect of the present disclosure, there is provided an aluminum separator for a fuel cell, the separator including: a separator substrate provided in a separator shape using aluminum; and a coating layer formed on a surface of the separator substrate by coating with a composite material composed of graphene and a radical scavenger.

The separator substrate may be made of pure aluminum and may have no oxide film formed on the surface thereof.

The graphene forming the coating layer may be reduced graphene oxide (rGO).

The radical scavenger forming the coating layer may be at least one of Ce, CeOx, Mn, and MnOx, or a mixture thereof.

The separator may further include a bonding layer formed between the separator substrate and the coating layer using the graphene.

The graphene forming the bonding layer may be reduced graphene oxide (rGO).

The coating layer may include metal conductive particles deposited thereon.

The conductive particles may be gold (Au) nanoparticles.

The radical scavenger forming the coating layer may be capped with a conductive polymer.

The radical scavenger may be at least one of Ce, CeOx, Mn, and MnOx, or a mixture thereof, and the conductive polymer may be polydiallyldimethylammonium chloride (PDDA, polyDDA).

The graphene and the radical scavenger that form the coating layer may be contained at a ratio of 0.1 to 30 parts by weight of the radical scavenger per 100 parts by weight of the graphene.

According to another aspect, there is provided a manufacturing method of an aluminum separator for a fuel cell, the manufacturing method including: preparing a separator substrate in a separator shape using aluminum; preparing a main coating solution in which graphene and a radical scavenger are mixed; removing an oxide film formed on a surface of the prepared separator substrate; and coating the prepared main coating solution on the surface of the separator substrate from which the oxide film is removed, thus forming a coating layer.

The manufacturing method may further include: after the coating the prepared main coating solution on the surface of the separator substrate, reducing the graphene forming the coating layer by allowing the coating layer formed on the surface of the separator substrate to be subjected to a reduction process.

In the preparing the main coating solution, the main coating solution may be prepared by mixing the graphene and the radical scavenger in a solvent at a ratio of 0.1 to 30 parts by weight of the radical scavenger per 100 parts by weight of the graphene, and the radical scavenger may be at least one of Ce, CeOx, Mn, and MnOx, or a mixture thereof.

The manufacturing method may further include: before the coating the prepared main coating solution on the surface of the separator substrate, preparing a pre-coating solution by mixing the graphene with a solvent; and coating the prepared pre-coating solution on the surface of the separator substrate from which the oxide film is removed, thus forming a bonding layer.

The manufacturing method may further include after the coating the prepared main coating solution on the surface of the separator substrate, depositing metal conductive particles on the coating layer.

In the depositing the metal conductive particles on the coating layer, the conductive particles may be gold (Au) nanoparticles.

In the coating the prepared main coating solution on the surface of the separator substrate, the radical scavenger mixed in the main coating solution may be prepared by capping with a conductive polymer.

The conductive polymer may be polydiallyldimethylammonium chloride (PDDA, polyDDA).

According to the present disclosure, through use of aluminum for the separator substrate, it is possible to achieve weight reduction. In addition, through use of the graphene having excellent thermal conductivity and electrical conductivity and being coated on the surface of the separator substrate, it is possible to increase thermal conductivity and electrical conductivity of the separator.

Furthermore, through coating of nanoparticles serving as the radical scavenger on the surface of the separator substrate together with the graphene, it is possible to increase the corrosion resistance of the separator.

Furthermore, through removal of the oxide film of the separator substrate before the graphene and the radical scavenger are coated on the surface of the separator substrate, it is possible to increase a bonding force between the separator substrate and the graphene.

Furthermore, through deposition of the metal conductive particles on the coating layer or through capping of the radical scavenger with the conductive polymer, it is possible to inhibit an increase in contact resistance of the coating layer due to use of the ceramic radical scavenger, thus reducing contact resistance of the separator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the aspects described herein may be changed to a variety of forms and the scope and spirit of the present disclosure are not limited to the description hereinbelow. The description is provided for allowing those skilled in the art to more clearly comprehend the present disclosure. Throughout the drawings, the same reference numerals will refer to the same or like parts.

First, an aluminum separator according to the present disclosure is a separator used for a conventional fuel cell stack for a vehicle. The shape of the separator is not limited to a specific shape, and may vary depending on the structure of the fuel cell stack.

In particular, the present disclosure is a technique for manufacturing an aluminum separator by applying a coating on the surface of the separator so as to improve electrochemical, mechanical, and physical properties of the separator. It will be noted that the shape of the separator is simplified for description purposes. Furthermore, a coating layer formed on the surface of the separator may be formed partially or entirely on the separator. However, it is assumed that the coating layer is formed on one surface of the separator for convenience of description and understanding.

Figure 2:
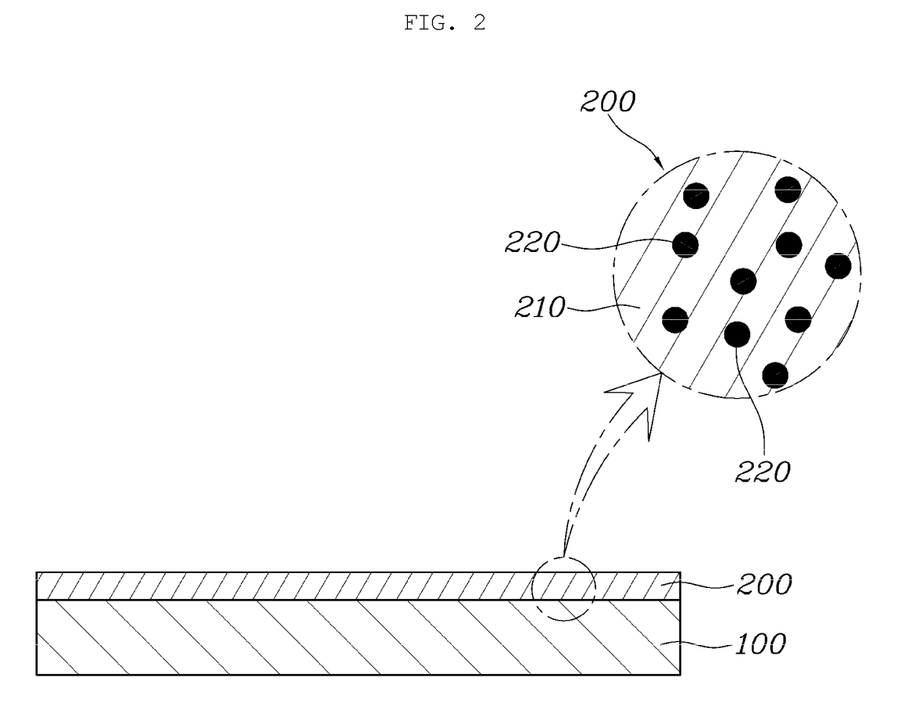
FIG. 2 is a sectional view showing an aluminum separator according to one aspect of the present disclosure.

FIG. 2 is a sectional view showing an aluminum separator according to one aspect of the present disclosure.

As shown in FIG. 2, an aluminum separator may include: a separator substrate 100 provided in a separator shape using aluminum; and a coating layer 200 formed on the surface of the separator substrate 100 by coating with a composite material composed of graphene 210 and radical scavengers 220.

The separator substrate 100, which is a workpiece that determines the shape of the separator, is made of aluminum (Al) to achieve weight reduction.

Aluminum is one third of the weight of common steel. Due to this, the separator substrate 100 made of aluminum contributes to achieving weight reduction of the separator. Also, aluminum has an excellent thermal conductivity and an extremely low electrical resistance, and thus the performance of a fuel cell stack can be improved. In addition, aluminum has good formability and is advantageous over stainless steel in terms of price. However, aluminum is problematic in that the corrosion resistance may not be sufficient, and the resistance may increase due to an oxide film formed upon exposure to air.

Meanwhile, the separator substrate 100 may be made of pure aluminum and may be used in the absence of an oxide film that is formed on the surface of the separator substrate 100 due to the nature of aluminum.

The coating layer 200 is coated on the surface of the separator substrate 100 for the purpose of compensating for the drawbacks of aluminum. The coating layer 200 includes the radical scavengers 220 for improving the corrosion resistance, and the graphene 210 helping attachment of the radical scavengers 220 to the surface of the separator substrate 100 and improving thermal conductivity and electrical conductivity.

The coating layer 200 is formed by preparing a main coating solution in the form of an aqueous solution in which the graphene 210 and the radical scavengers 220 are dispersed in a solvent such as water or glucose, coating the main coating solution on the surface of the separator substrate 100, and performing a reduction process.

Graphene oxide (GO) is used as the graphene 210 forming the coating layer 200. After formation of the coating layer 200, graphene oxide (GO) is reduced to exist as reduced graphene oxide (rGO).

Meanwhile, graphene oxide (GO), which contains functional groups such as —OH, —COO, —COOH, and the like, is easily dispersed in an aqueous solution and has excellent dispersion stability, while being a very low-priced material. In addition, graphene oxide (GO) can be easily converted to reduced graphene oxide (rGO) through an appropriate reduction process. In particular, graphene oxide (GO) forms a GO—Al complex with the highly active separator substrate 100 from which the oxide film formed on the surface thereof is removed. This makes it possible to form a rigid, stable, and uniform coating layer compared to a steel separator.

The radical scavengers 220 forming the coating layer 200 are means for scavenging radicals of the separator substrate 100. In this form, the radical scavenger 220 may use at least one of Ce, CeOx, Mn, and MnOx, or a mixture thereof. Herein, it is desirable that the radical scavengers 220 are used in the form of nanoparticles.

Ce, Coex, Mn, and MnOx used as the radical scavengers 220 suppress corrosion of aluminum and maintain the durability of the coating layer.

In detail, water generated from a fuel cell has a pH value of 2 to 5 due to the sulfonate ($SO_3$—) group of an ion exchange membrane. Also, hydrogen peroxide ($H_2O_2$) is generated depending on water generation and operation conditions, and an extremely harsh environment due to oxygen and humidification conditions is generated. In particular, hydrogen peroxide ($H_2O_2$) and active radicals thereof corrode most metallic materials. Therefore, the radical scavengers 220 for removing radicals are used as a countermeasure.

Meanwhile, Ce has an oxidant state of 0 to 4. Due to this, Ce and CeOx can suppress electrons from migrating into the coating layer.

Mn generates Mn ions. The Mn ions convert hydrogen peroxide ($H_2O_2$) to water ($H_2O$), and OH radicals generated at this time are neutralized with Ce.

As such, Ce and CeOx, Mn, and MnOx differ in the mechanism of action. Therefore, in this form, any one of Ce and CeOx, or a mixture thereof, may be selected and used for radical scavengers 220. Any one of Ce and CeOx, or a mixture thereof, and at least one of Mn and MnOx, or a mixture thereof, may be used together.

Meanwhile, the graphene 210 and the radical scavengers 220 that form the coating layer 200 may be contained at a ratio of 0.1 to 30 parts by weight of the radical scavengers 220 per 100 parts by weight of the graphene 210. The reason for limiting the amount of the radical scavengers 220 in relation to the amount of the graphene 210 is that when the amount of the radical scavengers 220 is below such a proposed range, the radical scavenging effect in the coating layer 200 may not be achieved, and when the amount of the radical scavengers 220 is above the proposed range, the electrical conductivity decreases as the amount of the ceramic radical scavengers increases. Therefore, in order to satisfy an electrical conductivity value for the separator, it is desirable to limit an upper value of the amount of the radical scavengers.

On the other hand, in order to increase a bonding force between the separator substrate 100 and the coating layer 200, this aspect may improve bonding between the separator substrate 100 and the coating layer 200.

Figure 3:
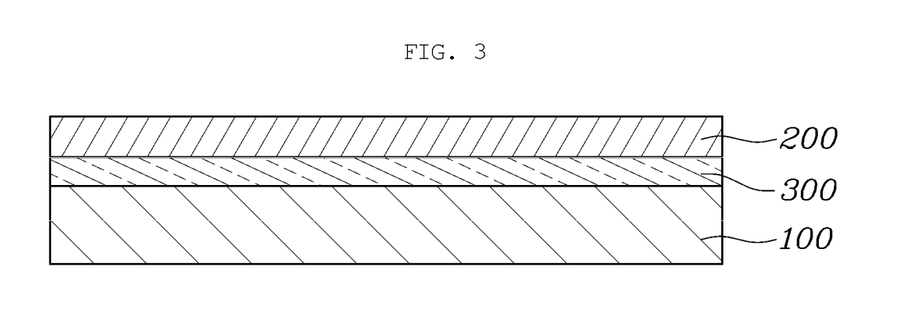
FIG. 3 is a sectional view showing an aluminum separator according to an aspect of the present disclosure.

FIG. 3 is a sectional view showing an aluminum separator according to another aspect.

As shown in FIG. 3, an aluminum separator according to another aspect includes: a separator substrate 100 provided in a separator shape using aluminum; a coating layer 200 formed on the surface of the separator substrate 100 by coating with a composite material composed of graphene 210 and radical scavengers 220; and a bonding layer 300 interposed between the separator substrate 100 and the coating layer 200 and made of the graphene 210.

The separator substrate 100 and the coating layer 200 remain same as the separator substrate 100 and the coating layer 200 of the preceding aspect described above, and thus overlapping descriptions thereof will be omitted herein.

The bonding layer 300 is interposed between the separator substrate 100 and the coating layer 200 and serves to enhance bonding between the separator substrate 100 and the coating layer 200, while helping more uniform formation of the coating layer 200.

In detail, the radical scavengers 220 such as Ce, CeOx, Mn, and MnOx used in the form of nanoparticles are relatively thicker than the two-dimensional graphene 210. Due to this, when the coating layer 200 composed of the graphene 210 and the radical scavengers 220 is directly coated on the surface of the separator substrate 100, non-uniformity in bonding may occur.

Therefore, the bonding layer 300 is prepared by preparing a pre-coating solution in the form of an aqueous solution containing the graphene 210, and applying the pre-coating solution on the surface of the separator substrate 100 before forming the coating layer 200 on the surface of the separator substrate 100. Then, the above-described coating layer 200 is formed on the surface of the bonding layer 300.

At this time as well, graphene oxide (GO) is used as the graphene 210 forming the bonding layer 300. After formation of the bonding layer 300 and the coating layer 200, graphene oxide (GO) forming the bonding layer 300 and the coating layer 200 is reduced to exist as reduced graphene oxide (rGO).

On the other hand, in order to increase the electric conductivity by decreasing the contact resistance of the coating layer 200, this aspect may improve components forming the coating layer 200.

Figure 4:
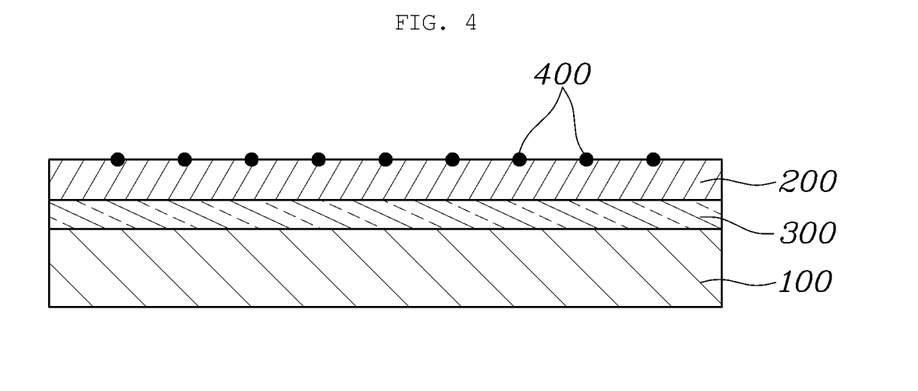
FIG. 4 is a sectional view showing an aluminum separator according to an aspect of the present disclosure.

FIG. 4 is a sectional view showing an aluminum separator according to another aspect of the present disclosure.

As shown in FIG. 4, an aluminum separator according to another aspect of the present disclosure includes: a separator substrate 100 provided in a separator shape using aluminum; and a coating layer 200 formed on the surface of the separator substrate 100 by coating with a composite material composed of graphene 210 and radical scavengers 220.

The separator substrate 100 remains same as the separator substrate 100 of the form described above, and thus overlapping descriptions thereof will be omitted herein.

As in the form described above, the coating layer 200 includes the graphene 210 and the radical scavengers 220 and is formed by coating on the surface of the separator substrate 100.

However, in this aspect, in order to compensate for a decrease in contact resistance due to influence of the ceramic radical scavengers 220 included in the coating layer 200, metal conductive particles 400 are deposited on the coating layer 200.

Herein, the conductive particles 400 may be made of a material having higher electrical conductivity than ceramic used as the radical scavengers 220. For example, the conductive particles 400 may be formed by depositing gold (Au) nanoparticles having excellent electrical conductivity on the surface of the coating layer.

In detail, due to the fact that the radical scavengers 220 included in the coating layer 200 are made of ceramic in order to suppress active radicals existing in the separator substrate 100, as the amount of the radical scavengers, the contact resistance with a gas diffusion layer (GDL) or a neighboring separator increases. In this case, the conductive particles 400, that is, the gold (Au) nanoparticles, may be deposited on the coating layer 200 in an island structure to reduce the increased contact resistance.

At this time, the deposition of the conductive particles 400 may be realized by various methods such as PVD, electroplating, or the like.

On the other hand, in order for the radical scavengers 220 included in the coating layer 200 to be stably bonded to the coating layer 200, this form may improve the radical scavengers 220.

Figure 5:
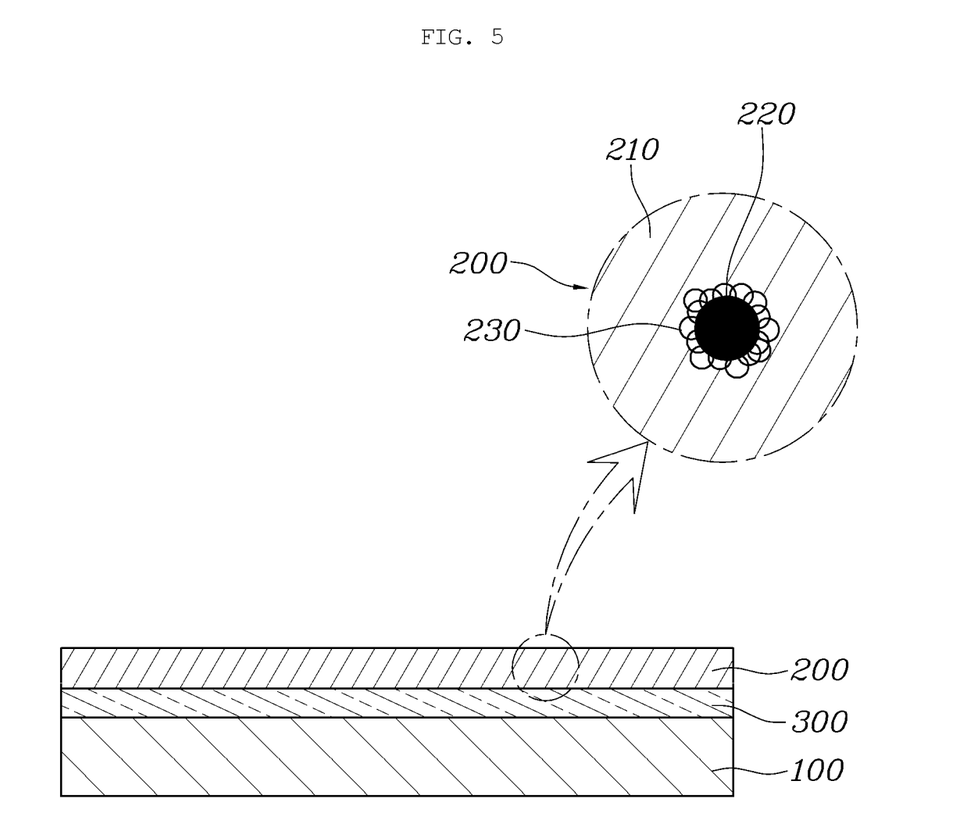
FIG. 5 is a sectional view showing an aluminum separator according to an aspect of the present disclosure.

FIG. 5 is a sectional view showing an aluminum separator according to another aspect of the present disclosure.

As shown in FIG. 5, an aluminum separator according to another aspect of the present disclosure includes: a separator substrate 100 provided in a separator shape using aluminum; and a coating layer 200 formed on the surface of the separator substrate 100 by coating with a composite material composed of graphene 210 and radical scavengers 220.

The separator substrate 100 remains same as the separator substrate 100 of the first aspect described above, and thus overlapping descriptions thereof will be omitted herein.

As in the first aspect described above, the coating layer 200 includes the graphene 210 and the radical scavengers 220 and is formed by coating on the surface of the separator substrate 100.

However, in this form, the radical scavengers 220 included in the coating layer 200 are capped with a conductive polymer 230. Therefore, the conductive polymer 230 capped on the radical scavengers 220 is electrostatically bonded to graphene oxide (GO), which has a negative (−) charge (zeta potential) when dispersed, thus improving a bonding force of the radical scavengers 220.

In detail, particles used as the radical scavengers 220 are very stable ceramic particles and thus are difficult to attach to the separator substrate 100. Therefore, the ceramic particles having a particle size of about 200 nm are capped with polydiallyldimethylammonium chloride (PDDA, polyDDA). The PDDA, which is the conductive polymer 230 having a positive (+) charge, caps the ceramic particles used as the radical scavengers 220.

When the conductive polymer 230 capped on the radical scavengers 220 is dispersed in an aqueous solution in which graphene oxide (GO) is dispersed, the conductive polymer is electrostatically bonded to the graphene oxide (GO) having a negative (−) charge (zeta potential), thus increasing a bonding force between the graphene oxide (GO) and the radical scavengers.

Although PDDA has been described as an example of the conductive polymer 230 in this form, the conductive polymer 230 is not limited to the PDDA. Therefore, any polymer may be used as long as having ability of capping the ceramic particles used as the radical scavengers 220, while having a positive (+) charge.

Hereinafter, a manufacturing method of an aluminum separator for a fuel cell according to various aspects of the present disclosure will be described with reference to the accompanying drawings.

Figure 6:
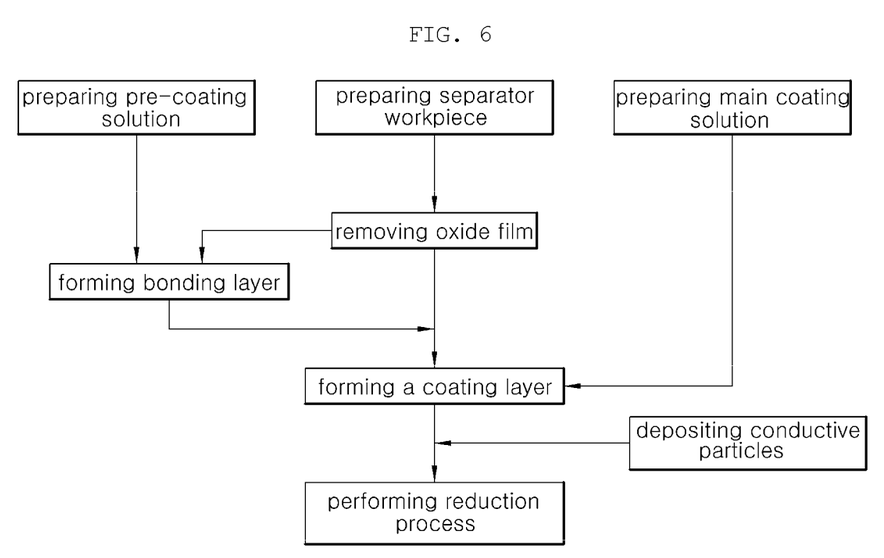
FIG. 6 is a flowchart showing a manufacturing method of an aluminum separator according to the present disclosure.
Figure 7:
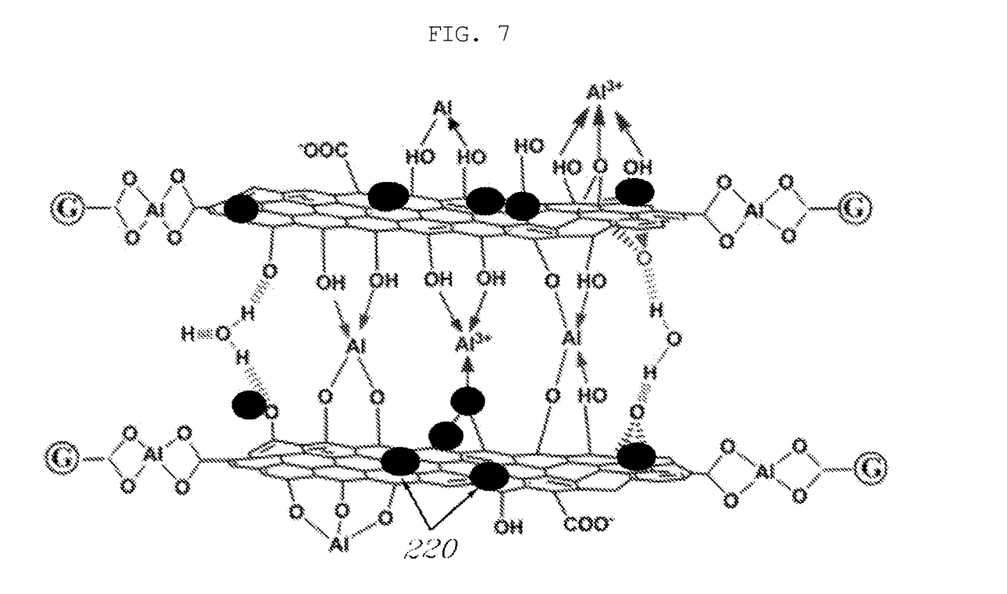
FIG. 7 is a schematic view showing a chemical bonding structure in a coating step in the manufacturing method the aluminum separator according to the present disclosure.
Figure 8:
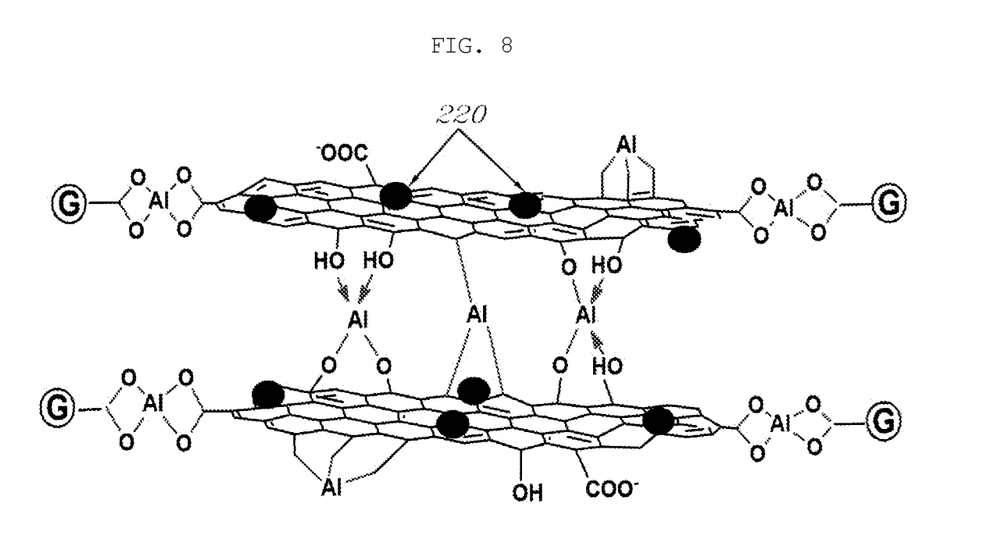
FIG. 8 is a schematic view showing a chemical bonding structure in a reduction step in the manufacturing method the aluminum separator according to the present disclosure.

FIG. 6 is a flowchart showing a manufacturing method of an aluminum separator according to the present disclosure, FIG. 7 is a schematic view showing a chemical bonding structure in a coating step in the manufacturing method the aluminum separator according to the present disclosure, and FIG. 8 is a schematic view showing a chemical bonding structure in a reduction step in the manufacturing method the aluminum separator according to the present disclosure.

As shown in the drawings, in order to manufacture an aluminum separator for a fuel cell according to an aspect of the present disclosure, a separator substrate is prepared in a separator shape using aluminum (workpiece preparation step)

Herein, the separator substrate is prepared by forming pure aluminum (Al) into a shape corresponding to a final shape of the separator.

Then, in order to prepare a main coating solution used for forming a coating layer, graphene and radical scavengers are mixed in a solvent (main coating solution preparation step)

The main coating solution is prepared in the form of an aqueous solution in which the graphene and the radical scavengers are dispersed in a solvent such as water or glucose. The graphene uses graphene oxide (GO), and the radical scavengers use at least one of Ce, CeOx, Mn, and MnOx, or a mixture thereof. Herein, it is desirable that the radical scavengers are used in the form of nanoparticles having a particle size of about 200 nm, for example.

Herein, the graphene and the radical scavengers are contained at a ratio of 0.1 to 30 parts by weight of the radical scavengers per 100 parts by weight of the graphene.

When the separator substrate and the main coating solution are prepared as described above, an oxide film formed on the surface of the prepared separator substrate is removed (removal step).

When the separator substrate made of aluminum is left in a natural state, a thin oxide film is formed on the surface thereof. In the removal step, the thin oxide film thus formed is removed. The removal of the oxide film may be performed by mechanical methods using sandpaper or chemical methods using sodium hydroxide and nitric acid. Therefore, the separator substrate from which the thin oxide film on the surface thereof is removed has a very high activity and thus is highly reactive with graphene oxide (GO). Herein, temperature control is performed to increase reaction activity.

When the oxide film is removed from the surface of the separator substrate, a coating layer is formed on the surface of the separator substrate (main coating step).

The main coating step is a step of forming a coating layer on the surface of the separator substrate. The coating layer is formed on the surface of the separator substrate using the prepared main coating solution.

For example, the separator substrate may be immersed in the main coating solution to coat the surface of the separator substrate with the main coating solution. After the separator substrate is immersed in the main coating solution for a predetermined period of time, the functional groups of —OH, —COO, and —COOH of graphene oxide (GO) react with aluminum constituting the separator substrate to form a complex, resulting in a strong bonding force being obtained.

If the separator substrate is coated with the main coating solution in the presence of the thin oxide film naturally formed on the surface thereof, very weak bonding is formed between the separator substrate and the graphene. Due to this, the coating layer is highly likely to peel off from the separator substrate.

However, in the present disclosure, through the removal of the oxide film formed on the surface of the separator substrate, the separator substrate can have high activity and can be bonded to the graphene in this state. Therefore, as shown in FIG. 7, various functional groups of graphene oxide (GO) that constitutes the coating layer are chemically bonded to aluminum constituting the separator substrate, whereby the coating layer is bonded to the surface of the separator substrate with a strong bonding force.

The main coating step is not limited to the proposed coating method, and various coating methods capable of forming the coating layer to a thickness of several micrometers may be used.

Meanwhile, when the coating layer is formed by coating the main coating solution on the surface of the separator substrate, the coating layer coated on the surface of the separator substrate is subjected to a reduction process and the coating layer is completed (reduction step).

The reduction step is a step of evaporating water molecules constituting the coating solution used in the main coating step and increasing the strength of the coating layer. For example, in the reduction step, the graphene oxide (GO) and the radical scavengers may be reduced by using a reducing agent such as hydrazine or by a heat process at a high temperature. For example, in the reduction step, the separator substrate on which the coating layer is formed may be reduced by a heat process at about 300° C. in a hydrogen atmosphere.

Through such a reduction process, as shown in FIG. 8, water molecules existing between multiple layers of graphene are evaporated and the strength of the coating layer is enhanced. Reduced graphene oxide (rGO) has a dense and rigid structure while having high electrical conductivity. As a result, the present disclosure can satisfy high requirements (electrical conductivity, corrosion resistance, and resistance to ion release) for a fuel cell separator.

On the other hand, in order to form a bonding layer between the separator substrate and the coating layer for the purpose of increasing a bonding force between the separator substrate and the coating layer, graphene is mixed with a solvent to prepare a pre-coating solution used for forming the bonding layer (pre-coating solution preparation step)

The pre-coating solution is prepared in the form of an aqueous solution in which graphene is dispersed in a solvent such as water or glucose. At this time as well, graphene oxide (GO) is used as the graphene.

Then, the prepared pre-coating solution is coated on the surface of the separator substrate from which the oxide film is removed, thus forming a bonding layer (pre-coating step).

After the bonding layer is formed on the surface of the separator substrate in advance as described above, a coating layer is formed on the surface of the separator substrate on which the bonding layer is formed by using the main coating solution. The graphene forming the bonding layer and the graphene forming the coating layer are the same material and thus can be bonded to each other with a high bonding force. Therefore, through formation of the bonding layer, it is possible to increase a bonding force between the separator substrate and the coating layer.

On the other hand, in order to increase the electrical conductivity by decreasing contact resistance of the coating layer, metal conductive particles are deposited on the coating layer (deposition step).

The metal conductive particles are deposited on the surface of the separator substrate with the coating layer famed on the surface thereof. For example, the conductive particles may use gold (Au) nanoparticles, and deposition thereof may be realized by various methods such as PVD, electroplating, or the like.

On the other hand, in order to more stably bond ceramic radical scavengers to the coating layer, the radical scavengers forming the coating layer may be capped with a conductive polymer.

To this end, in the main coating solution preparation step, the radical scavengers are capped with the conductive polymer before mixing the radical scavengers and the graphene into the solvent. For example, PDDA is used as the conductive polymer to cap the radical scavengers having a particle size of about 200 nm.

As such, due to the fact that the conductive polymer-capped radical scavengers are mixed with the graphene in the solvent to prepare the main coating solution in the form of an aqueous solution, and then the prepared main coating solution is used in the subsequent step, it is possible to increase a bonding force between the radical scavengers and the graphene.

Although aspects of the present disclosure have been described for illustrative purposes, those skilled in the art will appreciate that various modifications, additions and substitutions are possible, without departing from the scope and spirit of the disclosure.

What is claimed is:

1. A separator for a fuel cell, the separator comprising:
   a separator substrate comprising aluminum; and
   a coating layer formed on a surface of the separator substrate by coating with a composite material comprising graphene and a radical scavenger,
   wherein the radical scavenger is capped with a conductive polymer.

2. The separator of claim 1, wherein the separator substrate is made of pure aluminum and has no oxide film formed on the surface thereof.

3. The separator of claim 1, wherein the graphene forming the coating layer is reduced graphene oxide (rGO).

4. The separator of claim 1, wherein the radical scavenger forming the coating layer is at least one of Ce, CeOx, Mn, and MnOx, or a mixture thereof.

5. The separator of claim 1, further comprising:
   a bonding layer formed between the separator substrate and the coating layer using the graphene.

6. The separator of claim 5, wherein the graphene forming the bonding layer is reduced graphene oxide (rGO).

7. The separator of claim 1, wherein the coating layer includes metal conductive particles deposited thereon.

8. The separator of claim 7, wherein the metal conductive particles are gold (Au) nanoparticles.

9. The separator of claim 1, wherein the radical scavenger is at least one of Ce, $CeO_x$, Mn, and $MnO_x$, or a mixture thereof, and the conductive polymer is polydiallyldimethylammonium chloride.

10. The separator of claim 1, wherein the graphene and the radical scavenger that form the coating layer are contained at a ratio of 0.1 to 30 parts by weight of the radical scavenger per 100 parts by weight of the graphene.

* * * * *